Aug. 17, 1943.　　　　H. TEETOR　　　　2,327,077
BEVERAGE SERVING DEVICE
Filed June 5, 1939　　　　2 Sheets-Sheet 1
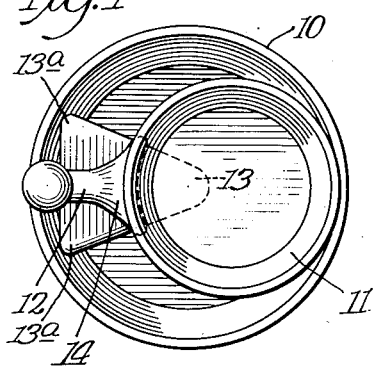
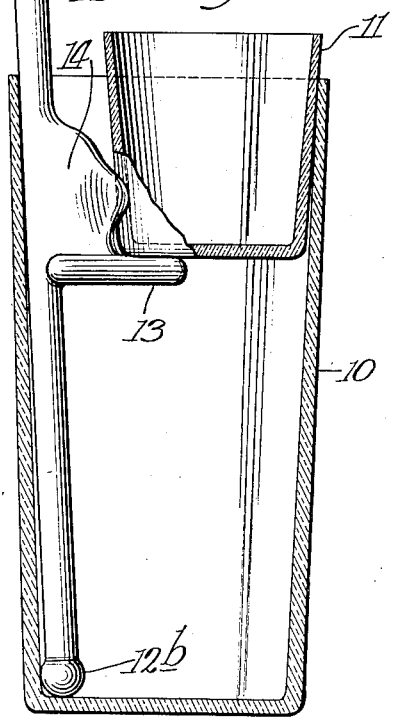
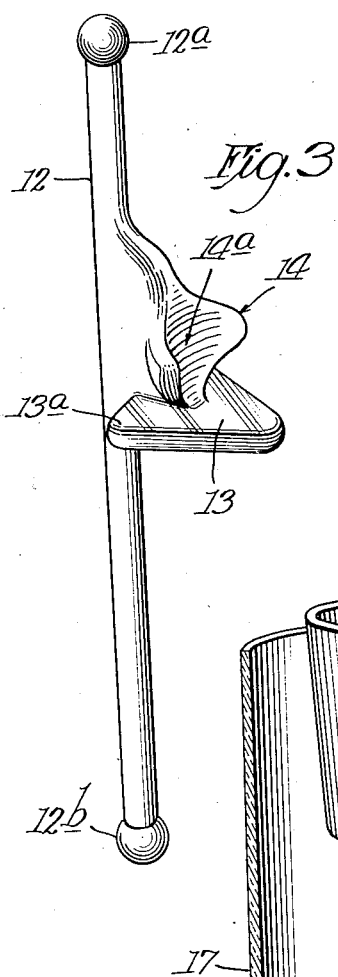
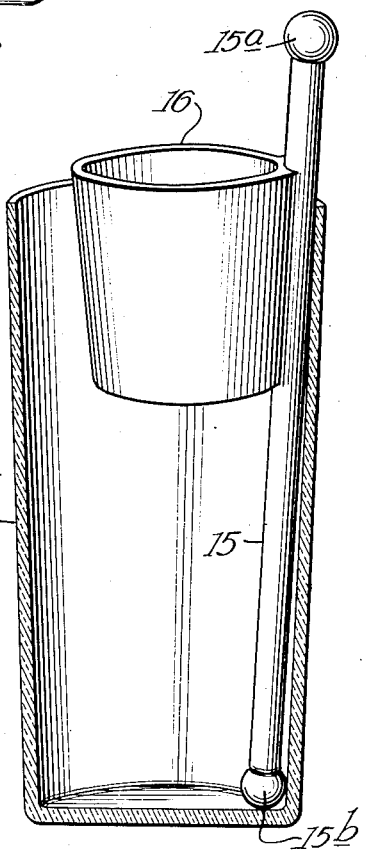
Inventor:
Herman Teetor
By Davis, Lindsey, Smith & Shonts
Attys.

Aug. 17, 1943.   H. TEETOR   2,327,077
BEVERAGE SERVING DEVICE
Filed June 5, 1939   2 Sheets-Sheet 2
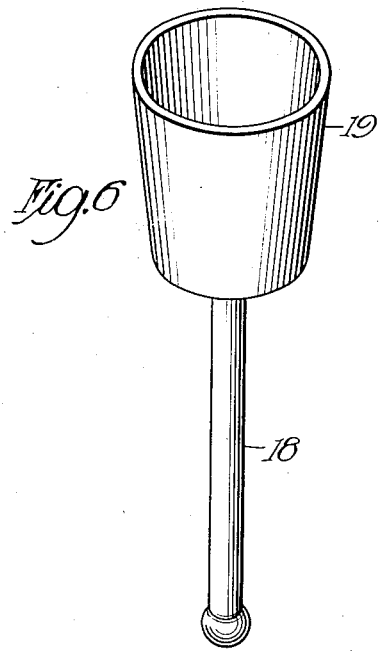
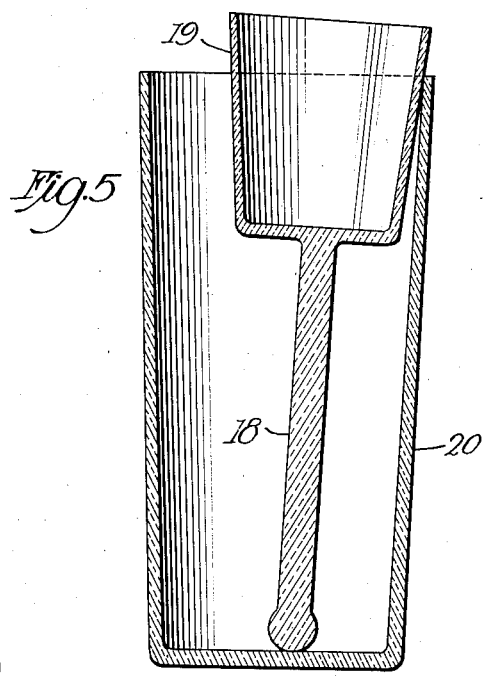
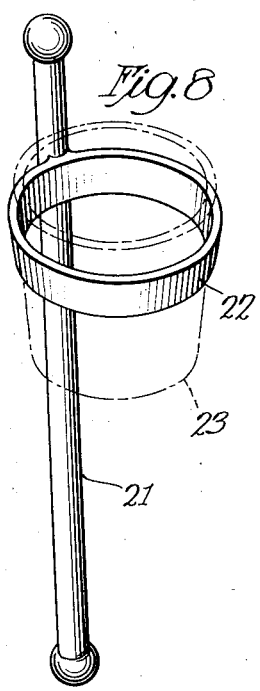
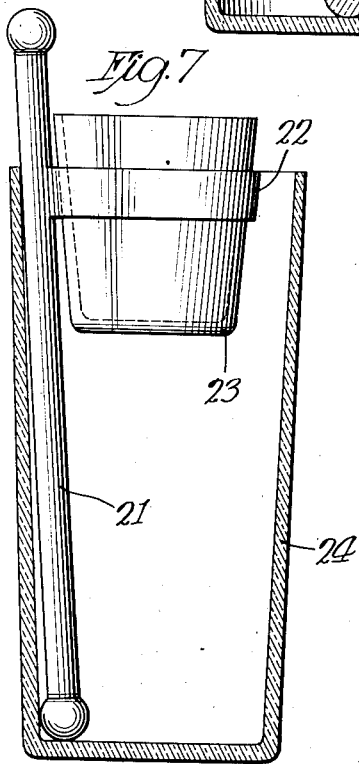
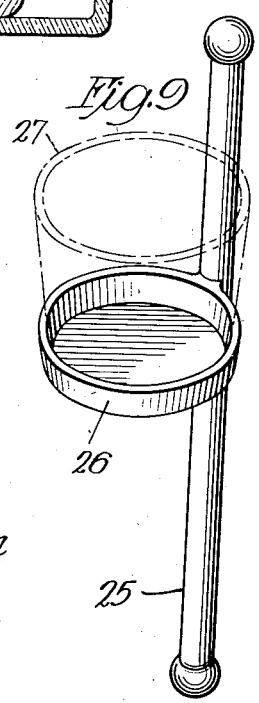
Inventor:
Herman Teetor
By Davis, Lindsey, Smith & Shonts
Attys.

Patented Aug. 17, 1943

2,327,077

UNITED STATES PATENT OFFICE 2,327,077

BEVERAGE SERVING DEVICE

Herman Tector, Hagerstown, Ind.

Application June 5, 1939, Serial No. 277,410

6 Claims. (Cl. 65—13)

My invention relates to beverage serving devices including those adapted for measuring a beverage and for mixing the same in a container from which the mixed beverage may be consumed.

One of the objects of my invention is to provide improved means of the foregoing character which is of simple and inexpensive construction, which avoids waste of materials employed in mixing beverages, which conserves space so that a greater number of persons may be served by a tray of given size, which facilitates identification of a particular beverage for a particular person, which is sanitary, and which serves its intended purpose in a highly efficient manner.

Another object is to provide beverage serving means which includes a swizzle stick or other mixing device adapted to support a jigger or other measuring device, the arrangement being such that the swizzle stick is adapted to support the jigger within a receptacle in which the beverage is to be served and mixed so that the contents of the jigger, if spilled, will be deposited within the receptacle from which the beverage is intended to be consumed.

A more specific object is to provide beverage serving means including a swizzle stick of such length that one end is adapted to seat upon the bottom of a receptacle in which the beverage is to be mixed and/or served and the other end projects from the open end of the receptacle sufficiently to permit it to be grasped by the user, which swizzle stick supports, between its ends, a jigger which is contained substantially within the receptacle when the swizzle stick is supported therein.

Other objects and advantages will become apparent as this description progresses and by reference to the drawings wherein, Figure 1 is a top plan view of one form of structure embodying my invention;

Fig. 2 is a vertical sectional view taken through the structure shown in Fig. 1;

Fig. 3 is a separated perspective view of the swizzle stick shown in the previous figures;

Fig. 4 is a view, partially in vertical section, illustrating another form of structure embodying my invention;

Fig. 5 in a vertical sectional view illustrating still another form of structure embodying my invention;

Fig. 6 is a perspective view of the swizzle stick shown in Fig. 5;

Fig. 7 is a view, partially in vertical section, of an additional structure embodying my invention;

Fig. 8 is a perspective view of the swizzle stick shown in Fig. 7, illustrating in dotted lines a jigger detachably supported thereby; and Fig. 9 is a perspective view of still another form of swizzle stick that may be employed in carrying out my invention.

My invention is quite useful in serving various kinds of beverages. It facilitates the serving of mixed beverages as well as so-called "straight" drinks with "chasers."

The structure shown in Figs. 1 to 3, inclusive, comprises a drinking glass or receptacle 10 in which the beverage may be mixed and served. The receptacle 10 is preferably, but not necessarily, formed of glass, as is customary. This structure further includes a jigger or mixing glass 11 which, in the case of mixed beverages, serves primarily as a measuring receptacle in which liquor or other ingredient to be used in mixing the beverage is measured. In mixing various beverages, it is necessary or desirable to stir and mix together the ingredients forming the beverage after they have been placed within the receptacle 10, and for that purpose I provide a swizzle stick 12 having knob-like ends 12ª and 12ᵇ. The swizzle stick 12 may be formed of any desired and suitable material and it is, preferably, of a length greater than the depth of the glass 10 so that its end 12ª will project from the glass sufficiently for it to be readily grasped by the user. The other end 12ᵇ of the swizzle stick is adapted to seat on the bottom of the glass 10, as shown in Fig. 2.

In the serving of mixed beverages, and particularly where one of the ingredients thereof is liquor and the person to whom the beverage is served desires to do his own mixing or have it mixed in his presence, it is customary to serve the liquor or other ingredient in a jigger, or the like, measuring glass. It is also customary to serve a liquor-filled jigger and a "set-up" glass separately on a tray, and in doing this the liquor is quite often spilled from the jigger with resultant waste. Also, in serving beverages in this prior manner, only a few drinks may be served on the ordinary tray surface; and where several drinks are served at one time, there is considerable confusion, resulting at times in a person being served the wrong beverage. My invention avoids the foregoing objectionable conditions and greatly facilitates the mixing and serving of beverages by providing measuring and mixing devices that may be associated directly with the particular receptacle or glass in which the beverage is to be mixed and served.

To the foregoing end, my invention provides for support of the jigger 11 by the swizzle stick 12 in such a way that both the swizzle stick and jigger may be disposed in easily accessible fashion within the receptacle 10. Specifically, the swizzle stick 12 (Figs. 2 and 3) is provided with a triangularly shaped, horizontal jigger supporting shelf 13 which is located at such a point that, when the swizzle stick is seated in the receptacle 10, it is spaced from the top of the receptacle a distance slightly less than the depth of the jigger 11. The swizzle stick is further provided with a vertical support 14 extending upwardly from the shelf 13 and provided with a parti-circular supporting surface 14ᵃ shaped to embrace the side wall of the jigger 11 (Figs. 1 and 2). The side wall of the jigger 11, as well as the side wall of the glass 10, is slightly tapered (Fig. 2), and the vertical jigger supporting surface 14ᵃ is so located that, when the swizzle stick and jigger unit is placed in the glass, the jigger is snugly retained upon the shelf support 13 between the swizzle stick and the opposite wall of the receptacle 10, with the upper edge of the jigger projecting slightly above the receptacle 19 where it may readily be grasped by the user. The rear corners 13ᵃ of the shelf 13 are adapted to strike the adjacent wall of the receptacle 10 to prevent rocking movement of the swizzle stick 12 thereby aiding the positioning of the jigger 11 as above described.

With the foregoing arrangement, the jigger 11 may be filled with liquor and then placed upon the swizzle stick support in the receptacle 10 for delivery to the user. The user may then remove the jigger (by grasping the jigger separately or by removing the swizzle stick 12) and pour the contents into the receptacle 10. The receptacle 10 may initially have another mixed beverage ingredient therein or such ingredient may be placed therein at the time the beverage is mixed. The swizzle stick 12 is then utilized to mix the contents of the receptacle 10 and it may or may not be removed in consuming the beverage. In the use of the structure just described, spillage of the contents of the jigger will find its way directly into the receptacle 10, and the proper filled jigger will always be associated with a particular receptacle or so-called "set-up" with a minimum of confusion when serving a plurality of drinks at one time.

In some instances the user may wish to drink the jigger contents without mixing the same with any other ingredient, using the contents of the container as a so-called "chaser." My invention facilitates this manner of service and permits the user to employ only one hand in handling both the "straight" drink and the "chaser," leaving the other hand free for other uses, such as holding food, etc.

My invention may take various other forms such as shown in Figs. 4 to 9, inclusive. Referring to Fig. 4, for example, the swizzle stick may take the form of an elongated member 15 having a receptacle or jigger portion 16 formed integrally therewith intermediate its knob-like ends 15ᵃ and 15ᵇ. The member 15 is of such length and the jigger portion 16 is so positioned thereon that, when the member is placed in the receptacle 17, the jigger portion 16 is supported within the receptacle near the open top thereof.

Or, as shown in Figs. 5 and 6, the swizzle stick 18 may take the form of an elongated member having a jigger portion 19 formed integrally with and constituting the upper end thereof. In this form, the lower part of the swizzle stick 18 serves as a handle for handling the jigger portion 19 when pouring the jigger contents into the glass or mixing receptacle 20, or when the contents of the jigger are consumed "straight" without mixing. The jigger portion 19 serves as a convenient hand-hold in using the swizzle stick to stir and mix the contents of the glass 20.

In the structure shown in Figs. 7 and 8, the swizzle stick 21 is similar to the swizzle sticks 12 (Fig. 3) and 16 (Fig. 4) except that it is provided with an integral ring 22 which is of a diameter adapted to receive the lower part of a detachable, taper-walled jigger 23. The ring 22 is so located on the stick 21 that its upper edge is disposed at the upper edge of the glass or mixing receptacle 24 when the stick is disposed in such glass (Fig. 7). Also, the ring 22 is of such diameter that only a small part of the jigger projects thereabove, which jigger part projects above the upper edge of the container 24 so that it may be readily grasped to detach it from the swizzle stick 21. If desired, the swizzle sticks shown in Figs. 2 and 8 may first be raised before detaching the jigger.

If desired, the swizzle stick may take the form shown in Fig. 9. In that case the swizzle stick 25 may be similar to that of Fig. 2, except that it is provided with a pan-like shelf 26 adapted to receive and support the bottom of a jigger shown in dotted lines at 27. In this form, the support 26 is preferably located at about the same position as the support 13 of Fig. 2, thereby positioning the jigger 27 similarly to the jigger 11 shown in Fig. 2.

I claim:

1. Beverage serving structure adapted for use with a glass or other receptacle in which a beverage is to be mixed, which comprises a swizzle stick of such length that its lower end is adapted to seat on the bottom of a mixing receptacle with its upper end projecting therefrom sufficiently to permit it to be grasped by the user, a receptacle of less size than the receptacle in which the drink is to be mixed, and means on said swizzle stick for supporting said lesser receptacle which includes a horizontal support upon which the bottom of said lesser receptacle is seated and a vertical support extending upwardly from said horizontal support and curved to embrace the side wall of the jigger.

2. Beverage serving structure comprising a mixing receptacle, a swizzle stick adapted to be supported in said receptacle, a measuring receptacle of less size than said mixing receptacle so that it may be disposed therewithin, and means intermediate the ends of said swizzle stick for supporting said measuring receptacle, which includes a horizontal support and a support extending upwardly therefrom and curved to embrace the side wall of said measuring receptacle, said supporting means being positioned in the mixing receptacle at such height that said measuring receptacle is retained within the open end portion of said mixing receptacle by the supporting means on said swizzle stick.

3. A swizzle stick or beverage mixing device, which comprises an elongated mixing member of such length that one end is adapted to seat upon the bottom of a receptacle with its other end projecting from the receptacle, a horizontal shelf-like portion between the ends of said member adapted to receive the bottom of a receptacle, and another portion extending upwardly from said shelf-like portion and having a curved surface adapted to embrace the side wall of a receptacle.

4. A swizzle stick or beverage mixing device, which comprises an elongated member having one end adapted to seat upon the bottom of a receptacle with its other end projecting from the receptacle, and a horizontally disposed, shallow pan-like member integrally formed on said member intermediate its ends for supporting a receptacle.

5. Beverage serving structure comprising a glass or other receptacle in which a beverage is to be served, a swizzle stick adapted to be supported within said receptacle, a jigger or other measuring glass of such size that it may readily be received within the open end of said serving receptacle, and means on said swizzle stick for supporting said jigger which includes a horizontally disposed and triangularly shaped support upon which the bottom of said jigger is adapted to seat, said support being so arranged that its rear corners are adapted to strike the wall of said serving receptacle and prevent rocking of said swizzle stick, and a vertical support extending upwardly from said horizontal support and having a surface adapted to embrace the side wall of said jigger.

6. A swizzle stick or beverage mixing device comprising an elongated body member having one end adapted to seat upon the bottom of a receptacle, an integral, triangularly shaped, horizontally disposed shelf on said body member intermediate its ends and having one of its sides extending transversely of said body member, and an integral, vertical support extending upwardly from said shelf and having a curved surface adapted to embrace the side wall of a receptacle.

HERMAN TEETOR.